Patented May 19, 1931

1,806,565

UNITED STATES PATENT OFFICE

PHILIP SHERMAN RUSSEL, OF DETROIT, MICHIGAN, ASSIGNOR TO DETROIT LUBRICATOR COMPANY, OF DETROIT, MICHIGAN, A CORPORATION OF MICHIGAN

VALVE

Application filed February 1, 1928. Serial No. 250,972.

My invention relates to new and useful improvements in valves, and more particularly to a valve for metering the flow of fluid.

An object of my invention is to provide a valve of simple construction which is efficient in operation.

Another object is to provide a valve to control and meter the flow of fluid, and which will not be subject to clogging at the valve port.

Still another object is to provide a valve having means to permit a minimum flow of fuel sufficient to maintain combustion at a burner.

The invention consists in the improved construction and combination of parts, to be more fully described hereinafter, and which will be particularly pointed out and distinctly claimed.

In the accompanying drawings to be taken as a part of this specification, I have fully and clearly illustrated a preferred embodiment of my invention, and in which drawings—

Figure 1:
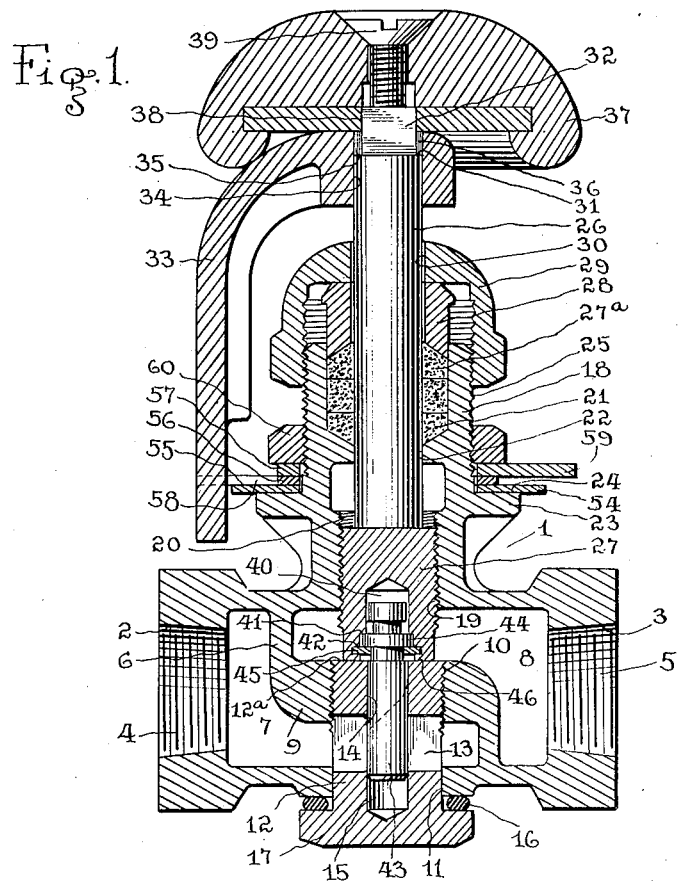
Figure 1 is a vertical central sectional view of my novel valve.
Figure 2:
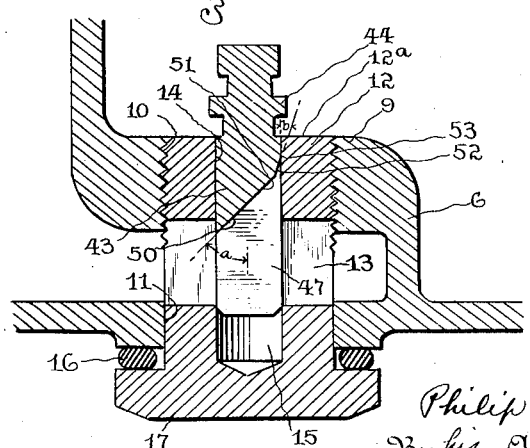
Fig. 2 is an enlarged detail in vertical central section.
Figure 3:
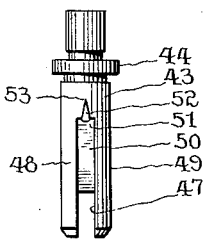
Fig. 3 is a detail of the valve member.

Referring to the drawings by characters of reference, 1 designates, generally, a hollow valve body having ports 2, 3, for the inlet and outlet of fluid, and which are preferably in alinement. The ports 2, 3 may be internally threaded, as at 4, 5, respectively, for insertion of the valve in a pipe line, or for connection to conduits (not shown). Within the body 1 is a web or partition member 6 which separates the interior thereof into chambers 7 and 8, which are in communication, respectively, with the ports 2, 3. The web 6 has a portion 9 which lies substantially in a plane through the center line of the inlet and outlet. Transversely through the portion 9 is an internally threaded aperture 10, and directly beneath aperture 10 is an opening 11 through the wall of valve body 1. Inserted through opening 11 and threaded into the aperture 10 is a valve seat plug 12. Transversely through the plug 12 is a passage 13 which lies beneath the web 6 when the plug is inserted in the casing 1, and which opens at its ends into chamber 7 for communication with the port 2. In the plug is an axial passage or aperture 14, preferably cylindrical, which intersects the passage 13, opening at its top end into chamber 8 and at its bottom end terminating in a socket 15. A suitable gasket 16 may be placed between the head 17 of the plug and the casing 1 to prevent leakage around the plug.

Opposite the opening 11 and on the valve body 1, is a hollow extension 18, preferably substantially cylindrical, which opens at its inner end 19 into the chamber 8. The end 19 of the extension is internally threaded, as at 20, which may be a quintuple thread. Also within the extension is an annular shoulder or seat 21 having a central opening 22. Externally surrounding the extension 18 adjacent the valve body is a flange 23 having an upwardly or outwardly facing seat or surface 24, for a purpose to be described, beyond which the extension is externally threaded, as at 25.

Extending axially into the extension 18 and through the opening 22 of seat 21, is a valve stem 26, preferably cylindrical, which is externally threaded at its lower end 27 for engagement with the internal threads 20 of the extension. Surrounding the stem 26 and seating on shoulder 21 is a packing 27ª of any suitable type, as, for example, packing rings which are compressed axially and expanded radially by a packing gland sleeve 28 forced into the extension above the packing by a packing gland nut 29 having an opening 30 therethrough for passage of the valve stem, and having threaded engagement with the external threads 25 of the extension 18. At its upper free outer end the stem 26 has a shoulder 31, above which is a polygonal portion 32, preferably rectangular. Overlying and supported on the shoulder 31 and surrounding the stem is an indicator member 33 having a bore 34 therethrough, with an internal shoulder 35 for cooperation with shoulder 31 and above which the member 33 is internally serrated to form teeth or notches 36 for cooperation with polygonal portion 32 to permit circumferential adjustment of the member 33 relative to the stem to certain fixed positions. This free upper end of the stem receives a stem operating member 37 which engages the polygonal portion 32, as at 38, to insure positive rotation of the stem by the member 37. Any suitable means 39, such as a screw threaded into the stem, may be employed to secure the member 37 on the stem; but it is to be noted that this screw 39 also serves to lock the indicator member 33 in its adjusted position.

The inner end of the stem 26 has an axial, preferably cylindrical, recess 40 coaxial with the passage 14 in the plug 12. Near its open end the recess 40 has a plurality of downwardly facing shoulders 41, 42. Extending into the recess 40 is the upper end of a valve member 43 having a peripheral flange 44, the upper face of which seats against the shoulder 41. Surrounding the valve member below flange 44 is an annular support 45 in which the valve member is freely rotatable, the under face of the flange 44 resting on the support 45. The peripheral portion of the support 45 seats against the shoulder 42 and is secured thereagainst and fixed to the valve stem 26 in any suitable manner, but preferably by burnishing over the end of the valve stem, as at 46. The width or thickness of the flange 44 is substantially equal to the distance between the shoulders 41, 42, so that there will be no longitudinal play or movement of the valve member relative to the stem; but this thickness is such that the valve member may rotate freely relative to the stem. The inner end of the stem 26 which has been burnished over may seat on the end 12$^a$ of the plug 12 around the passage 14 to positively seal the passage.

The valve member 43 projects through passage 14 and into socket 15, and is preferably cylindrical and has a close sliding fit with the cylindrical passage 14. Longitudinally and axially of the valve member 43 is an inclined groove comprising slots 47 and 52. The slot 47 extends through the valve member at its lower end, so that the valve member is bifurcated, having depending side elements 48, 49 which provide substantially parallel side walls for the groove and which in cross-section are substantially segments of a circle. The base 50 of the slot 47 is inclined at an angle $a$ to the longitudinal axis of the valve member, the angle $a$ preferably being substantially 45°. Opening into this inclined slot 47 at its uppermost or innermost end 51 is the slot 52, the side walls of which are preferably inclined to each other, preferably at an angle of substantially 60°, and the base of the slot 52 being inclined at an angle $b$ to the longitudinal axis of the valve member, the angle $b$ preferably being substantially 8°. Due to this construction of the second slot 52, it will taper from a maximum area at point 51, where it opens into slot 47 to a cut-off point 53 where the side walls of slot 52 and the circumferential face of the valve member 43 all merge.

Supported on the seat 24 and surrounding the extension 18, is an annular disk or member 54 on the upper face 55 of which are suitable indicia (not shown), for cooperation with the indicator member 33 to indicate the degree of opening of the valve. Also carried by this seat are adjustable stop members 56, 57, preferably in the form of rings which surround the extension 18 and from which extend arms 58, 59, respectively, which project into the path of movement of indicator member 33. The stop members 56, 57 and the disk 54 are held in adjusted position by a nut 60 which is threaded on the extension 18 and tightly clamps the members and disk against the seat 24.

The operation of the valve is as follows: The valve is particularly adapted for use in a fuel feed line to a burner, but I wish it to be understood that its operation in such an embodiment is merely illustrative, and the valve may have other uses. When the valve has been inserted in a fuel line by means of the ports 2, 3, then the stop members 56, 57 are set and locked in adjusted position by the nut 60, so as to permit free manual regulation of the valve by means of operating member 37 between points permitting a desired minimum and a desired maximum flow of fuel. The low limit stop 58 may be, and preferably is, set for the minimum fuel delivery which will maintain combustion at the burner, and such a position is one in which the second slot 52 cooperates with passage 14 to form an orifice. The high limit stop 59 may be and preferably is set for the maximum fuel delivery which can be properly handled by the boiler in which the burner is installed, and such a position is one in which the slot 47 cooperates with the passage 14. When the operating member 37 has been rotated to bring the indicator member 33 into engagement with the low limit stop 58, the valve will be open sufficiently to maintain a pilot flame at the burner. By employing a minimum flow passage which is substantially triangular in cross-section, particles of foreign matter held in suspension in the fuel may readily pass through the orifice when particles that are much smaller would clog the common form of needle valve using an annular orifice. As the operating member 37 is rotated toward the high limit stop 59, the metering slot 47 will come into action, and due to the inclined base 50 thereof will meter the flow of fuel, increasing it gradually in proportion to the rotation of the stem 26. It is also to be noted that his main metered fuel opening through slot 47 is compact, and therefore is free from clogging by any foreign matter which might be carried in the fuel.

What I claim and desire to secure by Letters Patent of the United States is: —

1. A valve comprising a hollow valve body having an inlet and an outlet, a partition in said body between said inlet and said outlet and having an aperture therethrough, a valve member in said aperture having a metering slot with an inclined base for metering the flow through said aperture, and said member having a pilot slot opening into said metering slot.

2. A valve comprising a hollow valve body having an inlet and an outlet, a partition in said body between said inlet and said outlet, said partition having a substantially cylindrical passage therethrough, and a vertically reciprocable substantially cylindrical valve member having a sliding fit in said passage, said valve member having a metering slot with an inclined base for metering the flow through said passage and having a pilot slot opening into said metering slot.

3. A valve comprising a hollow valve body having inlet and outlet ports, a partition between said ports, said partition having an aperture therethrough, a valve member having a sliding fit in said aperture, said valve member having a longitudinal slot with an inclined base to meter flow through said aperture and having a second slot, the base of which is of less inclination than the base of said first slot and which opens into said first slot.

4. A valve comprising a hollow valve body having inlet and outlet ports, a partition between said ports, said partition having an aperture therethrough, and a valve member having a sliding fit in said aperture, said valve member having a longitudinal slot with an inclined base to meter flow through said aperture and having a second slot, the base of which is of less inclination than the base of said first slot and which opens into said first slot, means adapted to stop closing movement of said valve member when said second slot is in operative relation to said aperture, and means adapted to stop opening movement of said valve member when said first slot is in operative relation to said aperture.

5. A valve comprising a hollow valve body having inlet and outlet ports, a partition between said ports, said partition having an aperture therethrough, a valve stem in the axial line of said aperture and adapted to seat about said aperture to seal the same, said stem having a recess in its lower end concentric with said aperture, a valve member extending into said recess and depending from said stem and having a sliding fit in said aperture, an annular member surrounding said valve member and closing said recess, said annular member being secured at its periphery to said stem, and means on said valve member engaging said annular member to support said valve member from said stem, said valve member having a longitudinal slot therethrough, the base of which is inclined to the longitudinal axis of said valve member to provide a passage of increasing cross-sectional area.

6. A valve comprising a hollow valve body having inlet and outlet ports, a partition between said ports, said partition having an aperture therethrough, a valve stem in the axial line of said aperture and adapted to seat about said aperture to seal the same, a valve member depending from said stem and having a sliding fit in said aperture, said valve member having a longitudinal slot therethrough, the base of which is inclined to the longitudinal axis of said valve member to provide a passage of increasing cross-sectional area, and having a second longitudinal slot opening into said first slot at its minimum cross-sectional area, the base of said second slot being inclined to the longitudinal axis of said valve member.

7. A valve comprising a hollow valve body having inlet and outlet ports, a partition between said ports, said partition having an aperture therethrough, a valve member having a sliding fit in said aperture, said valve member having a longitudinal slot with an inclined base to meter flow through said aperture, adjustable means adapted to stop closing movement of said valve member, and adjustable means adapted to stop opening movement of said valve member.

8. A valve comprising a hollow valve body having inlet and outlet ports, a partition between said ports, said body and said partition having alined apertures, a plug extending into said body and closing said apertures, said plug having a passage extending transversely therethrough beneath said partition, said plug having a passage concentric with said apertures and opening into said transverse passage and through the inner end of said plug, a valve member having a sliding fit in said second-named passage, said member having a metering slot, and means to seal said second-named passage to prevent leakage of fluid through said aperture and around said member when said slot is closed.

9. A valve comprising a hollow valve body having an inlet port and an outlet port, a partition within said body between said ports, said partition having a passage therethrough, a reciprocable valve stem threaded in said body concentric with said passage, and a valve member depending from said stem and projecting through said passage and being freely rotatable relative to said stem, said valve member having a slot of constantly increasing cross-sectional area and a second slot of constantly increasing cross-sectional area opening into said first slot, said second slot initially permitting flow of fluid through said passage when said stem is raised and said first slot permitting flow of fluid through said passage when said second slot has been raised above said partition.

10. A valve comprising a hollow valve body having an inlet port and an outlet port, a partition member between said ports, said member having an aperture therethrough, and a valve member having a sliding fit in said aperture, one of said members having a groove for metering fluid flow through said body and adapted to be cut off by the other of said members, the base of said groove being inclined to the longitudinal axis of said valve member, said groove for the major portion of its length having substantially parallel side walls, the side walls of said groove converging at the cut-off end thereof.

11. A valve comprising a hollow valve body having an inlet port and an outlet port, a partition member between said ports, said member having an aperture therethrough, a valve member having a sliding fit in said aperture, one of said members having a groove for metering fluid flow through said body and adapted to be cut off by the other of said members, the base of said groove being inclined to the longitudinal axis of said valve member, said groove for the major portion of its length having substantially parallel side walls, the side walls of said groove converging at the cut-off end thereof, adjustable means to limit movement of said valve member in one direction, and adjustable means to limit movement of said valve member in the opposite direction.

In witness whereof I have hereunto subscribed my name.

PHILIP SHERMAN RUSSEL.